United States Patent
Adiletta et al.

(10) Patent No.: US 8,451,519 B2
(45) Date of Patent: May 28, 2013

(54) METHOD AND APPARATUS FOR CONTROLLING COLOR IN MULTICOLOR MARKING PLATFORM

(75) Inventors: Mark A. Adiletta, Fairport, NY (US); Paul S. Bonino, Ontario, NY (US); Chad E. LaBarge, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 986 days.

(21) Appl. No.: 12/503,249

(22) Filed: Jul. 15, 2009

(65) Prior Publication Data

US 2010/0054769 A1 Mar. 4, 2010

Related U.S. Application Data

(60) Provisional application No. 61/093,005, filed on Aug. 29, 2008.

(51) Int. Cl.
*H04N 1/46* (2006.01)
*B41J 29/393* (2006.01)
*G06K 15/02* (2006.01)
*H04N 1/60* (2006.01)

(52) U.S. Cl.
CPC .............. *G06K 15/02* (2013.01); *H04N 1/6033* (2013.01)
USPC ............... 358/518; 356/1.9; 356/504; 347/19

(58) Field of Classification Search
USPC ....... 358/51, 504, 1.1, 1.9, 518, 1.98; 347/19, 347/43
See application file for complete search history.

(56) References Cited

U.S. PATENT DOCUMENTS

| 6,384,918 | B1 | 5/2002 | Hubble, III et al. | |
| 6,493,083 | B2 * | 12/2002 | Parisi et al. | 356/399 |
| 6,934,053 | B1 | 8/2005 | Mestha et al. | |
| 6,975,949 | B2 | 12/2005 | Mestha et al. | |
| 7,207,645 | B2 * | 4/2007 | Busch et al. | 358/518 |
| 7,307,752 | B1 | 12/2007 | Mestha et al. | |
| 7,333,208 | B2 | 2/2008 | Mestha et al. | |
| 8,009,320 | B2 * | 8/2011 | Bae | 358/1.18 |
| 2005/0093923 | A1 * | 5/2005 | Busch et al. | 347/43 |
| 2008/0170277 | A1 * | 7/2008 | Bae | 358/504 |
| 2008/0259374 | A1 | 10/2008 | Mestha et al. | |
| 2009/0009766 | A1 | 1/2009 | Bonino et al. | |
| 2009/0296091 | A1 | 12/2009 | Skinner et al. | |

OTHER PUBLICATIONS

Xerox iGen4 Press, 610P729739, Xerox Corporation, 2008 (4 pages).

(Continued)

*Primary Examiner* — Kimberly A Williams
(74) *Attorney, Agent, or Firm* — Fay Sharpe LLP

(57) ABSTRACT

A multicolor marking platform may include a marking engine with a storage device storing color standard data, a non-black color separation station, marking process stations to selectively mark a color test pattern on a target substrate, and a color control logic with color control applications to selectively control color characteristics of the marking engine by controlling the non-black color separation station or a marking process station; and a spectral sensor to detect each color test pattern on the target substrate and provide corresponding color measurement data to the color control logic. The color control logic may selectively control the non-black color separation station or a marking process station in response to the color measurement data and the corresponding color standard data in relation to the selected color control application. Various embodiments of the multicolor marking platform and a method for controlling color in same are also provided.

25 Claims, 14 Drawing Sheets

OTHER PUBLICATIONS x-rite i1iSis automated chart reader, L11-213, X-Rite, Incorporated, 2007 (Oct. 2007) (4 pages).

x-rite DTP41 Series II AutoScan Spectrophotometer, L11-044, X-Rite, Incorporated, 2006 (Jul. 2006) (2 pages).

x-rite Advanced Color Ensembles, L11-145, X-Rite, Incorporated, 2004 (Jan. 2005) (4 pages).

x-rite i1 color management system, Part No. 420139, X-Rite, Incorporated, 2007 (Sep. 2007) (12 pages).

* cited by examiner

METHOD AND APPARATUS FOR CONTROLLING COLOR IN MULTICOLOR MARKING PLATFORM

CROSS REFERENCE TO RELATED PATENTS AND APPLICATIONS

This application claims the right of priority and benefit of the earlier filing date of U.S. Provisional Patent Application Ser. No. 61/093,005 filed Aug. 29, 2008, the contents of which are fully incorporated herein by reference.

BACKGROUND

The present exemplary embodiment relates generally to controlling color control in a multicolor marking platform. It finds particular application in conjunction with using a spectral sensor for closed-loop color control of a multicolor marking engine within a xerographic marking platform. However, it is to be appreciated that the present exemplary embodiment is also amenable to various marking engines and other types of marking systems.

Existing xerographic color control processes may send the spectral data to the digital front end (DFE) in order for a customer to perform a color calibration. The process may require the printer to make a set of specific prints containing various color patches. These prints may be taken to a separate offline device to make color measurements. Human error may be introduced while handling the prints in this manner. Customer productivity may be reduced since the print engine (PE) is idle while they are performing the offline calibration. Secondly; the PE operator can make many errors while performing the offline calibration. Another process may use an inline device that sends information back to the DFE to correct for printer color inaccuracies. Additionally, and possibly most significant, since the calibration data is sent to the DFE, this process is not a real-time closed loop feedback system with the PE xerographic controls (XC).

INCORPORATION BY REFERENCE

The following documents are fully incorporated herein by reference: 1) Xerox iGen4™ Press brochure, 4 pages, unpublished as of Aug. 29, 2008, 2) U.S. Pat. No. 7,307,752 to Mestha et al., filed May 5, 2000, 3) U.S. Patent Application Publication No. 2008/0259374 (Ser. No. 11/737,576) to Mestha et al., filed Apr. 19, 2007, 4) U.S. Patent Application Publication No. 2009/0009766 (Ser. No. 12/203,454) to Bonino et al., filed Sep. 3, 2008 and claiming priority to U.S. Patent Application Ser. No. 61/056,095 to Bonino et al., filed May 27, 2008 and claimed as a continuation-in-part (CIP) to U.S. patent application Ser. No. 11/737,576, 5) U.S. Patent Application Publication No. 2009/0296091 (Ser. No. 12/203,520) to Skinner et al., filed Sep. 3, 2008 and claiming priority to U.S. Patent Application Ser. No. 61/056,090 to Skinner et al., filed May 27, 2008, 6) X-Rite i1 iSis Automated Chart Reader brochure, X-Rite, Inc., Grand Rapids, Mich., 4 pages, 2007, 7) U.S. Pat. No. 6,384,918 to Hubble III et al., filed Mar. 23, 2000, 8) U.S. Pat. No. 6,934,053 to Mestha et al., filed Jan. 19, 2000, 9) U.S. Pat. No. 6,975,949 to Mestha et al., filed Apr. 27, 2004, and 10) U.S. Pat. No. 7,333,208 to Mestha et al., filed Dec. 20, 2004.

BRIEF DESCRIPTION

In one aspect, an apparatus for controlling color in a multicolor marking platform in provided. In one embodiment, the apparatus includes: a marking engine, comprising: a storage device storing color standard data; at least one non-black color separation station and associated marking process stations to selectively mark at least one color test pattern on a target substrate, each color test pattern related to a color represented in the color standard data; and a color control logic in operative communication with the storage device and providing color control applications to selectively control color characteristics of the marking engine by controlling one or more station of the at least one non-black color separation station and associated marking process stations; and a spectral sensor in operative communication with the marking engine to detect each color test pattern on the target substrate and provide corresponding color measurement data to the color control logic in relation to the selected color control application; wherein the color control logic selectively controls one or more station of the at least one non-black color separation station and associated marking process stations in response to the color measurement data and the corresponding color standard data in relation to the selected color control application.

In another aspect a method of controlling color in a multicolor marking platform is provided. In one embodiment, the method includes: a) providing color standard data in a storage device; b) selectively marking at least one color test pattern on a target substrate using a marking engine of the multicolor marking platform in response to selection of a color control application from a plurality of available control applications, each color test pattern related to a color represented in the color standard data, the marking engine comprising at least one non-black color separation station, associated marking process stations, the storage device, and a color control logic; c) detecting each color test pattern on the target substrate using a spectral sensor of the multicolor marking platform; d) providing color measurement data for each detected color test pattern from the spectral sensor to the color control logic in relation to the selected color control application; and e) selectively controlling one or more station of the at least one non-black color separation station and associated marking process stations in response to the color measurement data and the corresponding color standard data in relation to the selected color control application using the color control logic.

In yet another aspect, an apparatus for controlling color in a multicolor xerographic marking platform is provided. In one embodiment, the apparatus includes: a xerographic marking engine, comprising: a memory device storing color standard data; a plurality of non-black color separation stations, a transfer station, and a fusing station to selectively mark at least one color test pattern on a target substrate, each non-black color separation station including a charging station, an imaging and exposing station, and a developing station, each color test pattern related to a color represented in the color standard data; and a multi-purpose interface board (MIB) in operative communication with the memory device and providing color control applications to selectively control color characteristics of the xerographic marking engine by controlling one or more station of the charging station, imaging and exposing station, developing station, transfer station, and fusing station associated with the xerographic marking engine, wherein the color control applications include at least one of a color calibration application, a color maintenance application, a tone reproduction curve (TRC) linearization application, a spot color measurement application, a spot color editing application, and a marking platform color profiling application; and a spectrophotometer in operative communication with the xerographic marking engine and disposed between the fusing station of the xerographic marking engine and a finishing station of the multicolor xerographic marking platform to detect each color test pattern on the target substrate and provide corresponding color measurement data to the MIB in relation to the selected color control application; wherein the MIB selectively controls one or more station of the charging station, imaging and exposing station, developing station, transfer station, and fusing station associated with the xerographic marking engine in response to the color measurement data and the corresponding color standard data in real-time in relation to the selected color control application.

DETAILED DESCRIPTION

Figure 1:
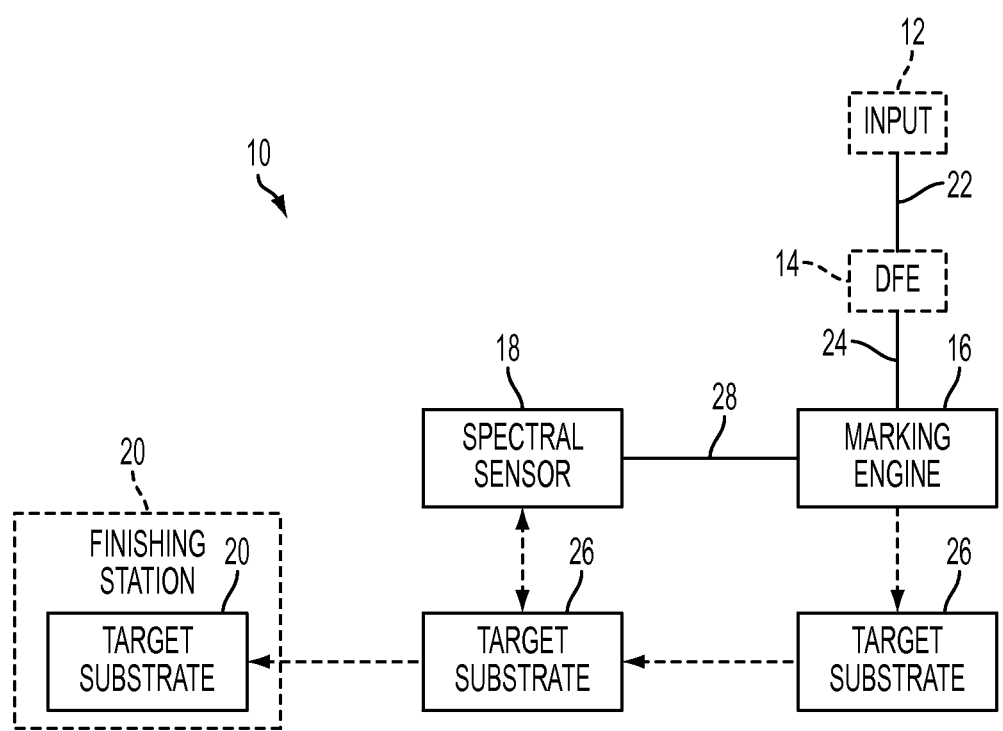
FIG. 1 is a block diagram of an exemplary embodiment of a multicolor marking platform.

This disclosure describes various embodiments of a closed loop color calibration system within the marking engine or print engine (PE) of a multicolor marking platform, such as a multicolor xerographic printer or copier. In one embodiment, the system includes a spectrophotometer system to automatically measure color patches and provide dynamic feedback for a variety of xerographic applications (e.g., including PE color calibration, PE color maintenance, TRC linearization, spot color read, spot color measurements, auto spot color editing, profiling, etc.). The closed loop system provides feedback of, for example, the spectral or L*a*b* values to the PE marker input/output processor (MIOP) board. The various aspects of the closed loop system, including the physical spectrophotometer and interfaces, and the toner patch spectral compensation routine and how it processes the data, may be fully integrated into the PE in any suitable combination. Color data may be processed on the multi-purpose interface board (MIB). The PE can use the spectral data to make xerographic compensation for any color drift that may be occurring (e.g., effects from the xerographic, transfer, and fusing subsystems). No other printing device does this—others may use feedback to the DFE.)

Since color standards (e.g., such as Pantone) are established using other external spectrophotometer devices, the compensation algorithm that is used to normalize the xerographic and fusing effects can also include the Pantone standard to shift or warp the spectral data output to match the known standards. These algorithms may reside on the MIB which allows for corrections to the xerographic process rather than the DFE image processing and/or raster image processing (RIP).

In the printing industry, color critical customers may demand consistent and accurate output. The level of color control often expected in the dry ink environment of today was once only delivered from ink presses. Ideally, printers should achieve this level of performance without negatively impacting press productivity and ease of use. In order to meet these expectations, it may not be enough for a control system to only measure the xerographic electrostatic settings before an image is transferred to paper. Measuring the xerographic electrostatic settings after the image has been fused to the paper may improve color control. This is in part due to the transfer efficiency of the transfer corona devices and fuser impacts for any given xerographic device. An exemplary embodiment of a control system that can perform to these heightened customer expectations may include a sensor that can capture color data at a high speed and feed it directly to the xerographic control (XC) system of the PE. This type of printer architecture allows multiple new user applications to be implemented.

TABLE 1

Level 1 through Level 5 Xerographic Color Control

| Level | General | Detail |
|---|---|---|
| 1 | Process Controls Electrostatics Control | SUMMARY: Electrostatics: Controls photoreceptor (PR) charge levels for each station (Vc). SENSOR: Electrostatic Voltmeters (ESVs), reads Inter Page Zone (IPZ) patches to measure voltage on the PR. ACTUATOR: AC/DC Grid Voltage Levels are adjusted to |

TABLE 1-continued

Level 1 through Level 5 Xerographic Color Control

| Level | General | Detail |
|---|---|---|
| 1 | Process Controls Toner Concentration (TC) Control | maintain a target Vc (target is set by level 2 ddg control loop). SUMMARY: TC Control: Regulates % TC (Toner Concentration) in order to maintain consistent development. Different algorithms are used as an estimate of the depletion rate of toner from the housing. SENSOR: TC Sensors infers % tc from magnetic permeability measurements, which is correlated with % tc and other material properties (toner age, developer break in). ACTUATOR: The toner dispense motor duty cycle is adjusted based on estimated toner depletion (FFPC, based area coverage), and the housing % tc estimate (the latter accounts for errors in estimated toner depletion vs real toner depletion). |
| 2 | Process Controls Developability and Dot Gain Controls | SUMMARY: The target PE Tone Reproduction Curve (TRC) is an output of the Process Integration group's IQ model and represents the TRC which optimizes the xerographically controlled IQ attributes: Dot Gain (DDG), lines, color gamut. SENSOR: Toner area coverage sensors provides an optical reading in all low, mid, and high MYCK patches ACTUATOR: These are the Level 2 control loops: i) Vmc, ii) ROS intensity (LaserPower), and iii) Vcm. |
| 3 | Process Controls TRC Control for each Separation | SUMMARY: PE TRC Fine Adjustment: Using the target PE TRC and measurements of the current TRC, a digital look up table is generated to transform the customers contone values into a 1 through 255 value provides the foundation of color stability for each separation. SENSOR: Toner area coverage sensor and In Line Spectrophotometer. ACTUATOR: Look up table updated to reflect TRC adjustments. |
| 4 | Process Controls PE TRC Calibration (setup routine) | SUMMARY: PE TRC Calibration: Defines target TRC curves for level 2 and 3 in order to adjust for PE differences over time and between machines in order produce a more consistent color output. SENSOR: In Line Spectrophotometer read of a set of printed (on paper) color patches. ACTUATOR: Output of Spectrophotometer reads are used for TRC target definition. |
| 5 | Process Controls Automatic Gray Balance Monitor | SUMMARY: This function allows for an automatic (or semi-automatic) detection that the system requires a Gray Balance update and sharing the overlay Color Rendition Dictionary (CRD) targets across machines so that prints made across the country on different machines would look alike (never implemented). The level 2 and 3 targets are updated automatically. SENSOR: Spectrophotometer reads a set of printed (on paper) color patches for calibration. ACTUATOR: Output of Spectrophotometer reads are fed to the DFE to modify the ICC profile. |

Turning now to the drawings, FIG. 1 an exemplary embodiment of a marking platform 10 may include an input 12, a digital front end (DFE) 14, a marking engine 16, a spectral sensor 18, and a finishing station 20. The input 12 may provide digital image data 22 to the DFE 14. The input 12 may include a scanner, individual computer, distributed computer network, electronic storage device, or any device capable of generating or storing the digital image. During normal operations, the DFE 14 may process the digital image data 22 to create machine-readable image data 24 that may be provided to the marking engine 16. The marking engine 16 may receive the machine-readable image data 24 from the DFE 14 and produce a human-readable version of the digital image on a target substrate 26. The marking engine 16 may include logic that controls operations (e.g., image receiving member transport speed, positioning of marking members, dispense of marking material, etc.) within the marking engine 16.

The spectral sensor 18 may include a spectrophotometer such as the ILS 15, DTP70, or i1 iSis automated spectrophotometers from X-Rite of Grand Rapids, Mich. The spectral sensor 18 may also include a full width array (FWA) spectrophotometer. For additional information on FWA spectrophotometers, see U.S. Pat. No. 6,384,918 to Hubble III et al., U.S. Pat. No. 6,934,053 to Mestha et al., U.S. Pat. No. 6,975,949 to Mestha et al., and U.S. Pat. No. 7,333,208 to Mestha et al., all commonly assigned to Xerox Corporation of Norwalk, Conn. The contents of these patents are all fully incorporated herein by reference.

During diagnostic and maintenance operations, the marking engine 16 may produce one or more test pattern on the target substrate 26. The spectral sensor 18 may be located between the marking engine 16 and the finishing station 20 to detect certain parameters (e.g., reflectance of test patterns, coloration of test patterns, etc.) of the marking process from test patterns on the target substrate 26. The spectral sensor 18 may include circuitry that scales and conditions detected parameter measurements to create electrical signals. The electrical signals may be provided to the marking engine 16 as feedback signals 28 to facilitate control of color characteristics of the marking platform 10. The marking engine 16 may use toner marking, ink marking, or any marking technology capable of producing a human-readable image using marking material.

In marking technologies, the human-readable version of the digital image may be created by depositing marking material on a target substrate. The target substrate may be white paper. However, any type of target substrate suitable for marking by the marking engine 16 may be used. Marking platforms 10 that use ink as a marking technology include all the various forms of inkjet printing (e.g., ink, dye sublimation, wax, etc.) and all forms of printing presses that transfer images from inked plates to target substrate. Ink-jet printers and offset printing presses are common examples of marking platforms that implement ink marking technology. Marking platforms that use toner marking technology include electrophotographic printers, copiers, and multifunction systems. Toner marking is also known as electrophotographic marking. The various components of the marking platform 10 disclosed herein may be implemented using hardware, software, or firmware in any suitable combination.

Figure 2:
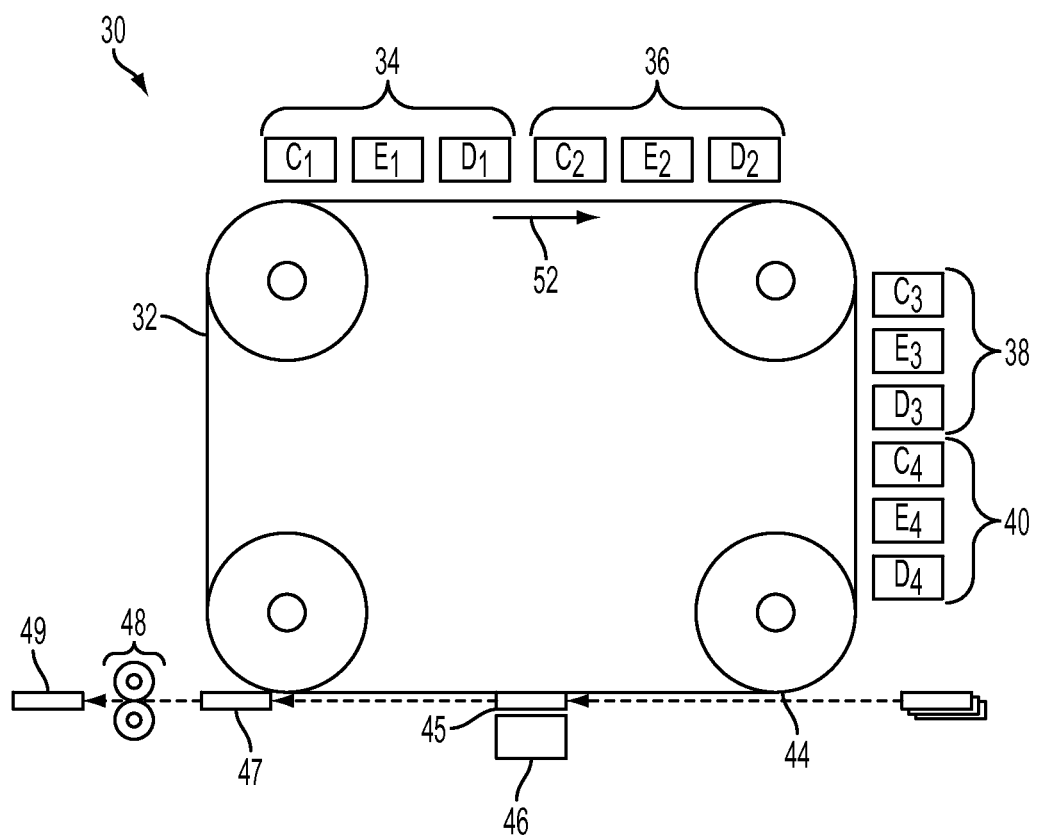
FIG. 2 is a block diagram of an exemplary embodiment of a multicolor xerographic marking engine.

Referring to FIG. 2, an exemplary embodiment a single pass multicolor electrophotographic marking engine ("single pass marking engine") 30 is shown. Since the art of electrophotographic marking is well known, FIG. 2 and the discussion that follows provides a brief overview of the various processing stations of the marking platform to which the processes for controlling color described herein relate. The single pass marking engine 30 may include a PR belt 32, four sets of color separation stations (34, 36, 38, 40), a target substrate path 44, a transfer station 46, and a fusing station 48. Each color separation station (34, 36, 38, 40) may include a charging station ($C_1 \ldots C_4$), an imaging and exposing station ($E_1 \ldots E_4$), and a developing station ($D_1 \ldots D_4$). Accordingly, the single pass marking engine 30 may develop a composite full color image from four color separations (e.g., cyan (C), magenta (M), yellow (Y), and black (K)).

While FIG. 2 shows a single pass marking engine 30, the processes for controlling color described herein are not limited to this type of marking engine. On the contrary, the processes for controlling color described herein may also be implemented in all alternatives, modifications, and equivalents as may be included within the spirit and scope of this description and the appended claims. The processes for controlling color described herein are indeed applicable to any electrophotographic marking engine, including marking engines that use multiple pass architectures that either accumulate the composite multicolor image on the PR belt or the target substrate and marking engines that employ alternate single pass architectures (e.g., tandem architecture), including those that use an intermediate transfer belt (ITB). The processes for controlling color described herein are also applicable to ink marking engines, including ink-jet marking engines, printing presses, and printing technologies such as lithography. With regard to marking platforms incorporating an applicable marking engine architecture, the processes for controlling color described herein are applicable to copiers, printers, multifunction peripherals, and other devices using full color marking engines, high fidelity color marking engines, and highlight color marking engines that implement either process color separation, spot color separation, or a combination of process color separation and spot color separation.

With continuing reference to FIG. 2, the electrophotographic process begins at a charging station $C_1$ of a first color separation station 34. The following discussion basically tracks images (e.g., test patterns) through one cycle of the electrophotographic process. The imaging region is advanced by the PR belt 32 in a clockwise direction as indicated by the process direction arrow 52 through the various stations comprising the complete process. The imaging region passes through the charging station $C_1$ where a corona generating device charges the region to a relatively high, substantially uniform, preferably negative potential. Next, the charged imaging region is advanced through an imaging and exposing station $E_1$. At the imaging and exposing station $E_1$, the uniformly charged imaging region is exposed by focusing a light source, such as a laser or light emitting diode (LED) array, on the region and discharging specific areas of the surface to create an electrostatic latent image representing the desired output from the first color separation station 34. Next, the imaging region is advanced through a developing station $D_1$. At the developing station $D_1$, a development system advances developer material consisting of carrier granules and charged toner particles into contact with the electrostatic latent image. The toner particles form a first developed toner image layer on the electrostatic latent image in the first color separation. The first color separation, for example, may be black (K).

The electrophotographic process continues as the imaging region advances to a second color separation station 36. At the second color separation station 36, the imaging region passes through a charging station $C_2$ where a corona recharge device is employed to raise the voltage level of both the toned and untoned areas of the imaging region to a substantially uniform level. The recharging device serves to recharge the PR to a predetermined level. Next, the recharged imaging region is advanced through an imaging and exposing station $E_2$. At the imaging and exposing station $E_2$, the uniformly charged imaging region is selectively discharged to create a latent image representing the desired output from the second color separation station 36. Next, the imaging region is advanced through a developing station $D_2$. At the developing station $D_2$, a development system presents toner particles to the electrostatic latent image. The toner particles form a second developed toner image layer on the imaging region in the second color separation. The second color separation, for example, may be yellow (Y).

The electrophotographic process continues as the imaging region advances through a third color separation station 38 and a fourth color separation station 40. For the third color separation station 38, the imaging region passes through a charging station $C_3$, an imaging and exposing station $E_3$, and a developing station $D_3$ in the same manner as for the second color separation station 36. The toner particles from the developing station $D_3$ form a third developed toner image layer on the imaging region in the third color separation. The third color separation, for example, may be magenta (M).

For the fourth color separation station 40, the imaging region passes through a charging station $C_4$, an imaging and exposing station $E_4$, and a developing station $D_4$, also in the same manner as for the second color separation station 36. The toner particles from the developing station $D_4$ form a fourth developed toner image layer on the imaging region in the fourth color separation. The fourth color separation, for example, may be cyan (C).

At this point, a full color composite toner image is developed on the imaging region of the PR belt 32. When a test pattern image is to be marked on target substrate, the full color composite toner image for the test patterns on the PR belt 32 advances to the transfer station 46. As the toner image advances to the transfer station 46, a target substrate sheet 45 is simultaneously fed along a target substrate path 44 to the transfer station 46. At the transfer station 46, the back of the target substrate 45 is charged such that, when the target substrate 45 is moved into contact with the PR belt 32, the toner particles forming the test patterns are attracted and transferred to the target substrate 45 forming a transferred target substrate 47. The transferred target substrate 47 continues along the target substrate path 44 to a fusing station 48. At the fusing station 48, the transferred target substrate 47 passes between a heated fuser roller and a pressure roller and the toner particles are permanently affixed to the transferred target substrate 47, forming the fused target substrate 49. After the fusing station 48, a chute (not shown) guides the fused target substrate 49 to a catch tray or finishing station (not shown) where it is accessible to an equipment operator. After the transfer operation, the PR belt 32 advances from the transfer station 46 to a cleaning station (not shown). At the cleaning station, residual toner particles are removed from the PR belt 32 to prepare it for another electrophotographic cycle.

For the embodiment being described, a spectral sensor (not shown) may be located between the fusing station 48 and the catch tray or finishing station (not shown) and oriented to detect test patterns on the fused target substrate 49 as it proceeds along the target substrate path 44. The spectral sensor may be located within the marking engine 30 or anywhere between the fusing station 48 and the catch tray or finishing station (not shown) of the marking platform 10. The various components of the marking engine 30 disclosed herein may be implemented using hardware, software, or firmware in any suitable combination.

Figure 3:
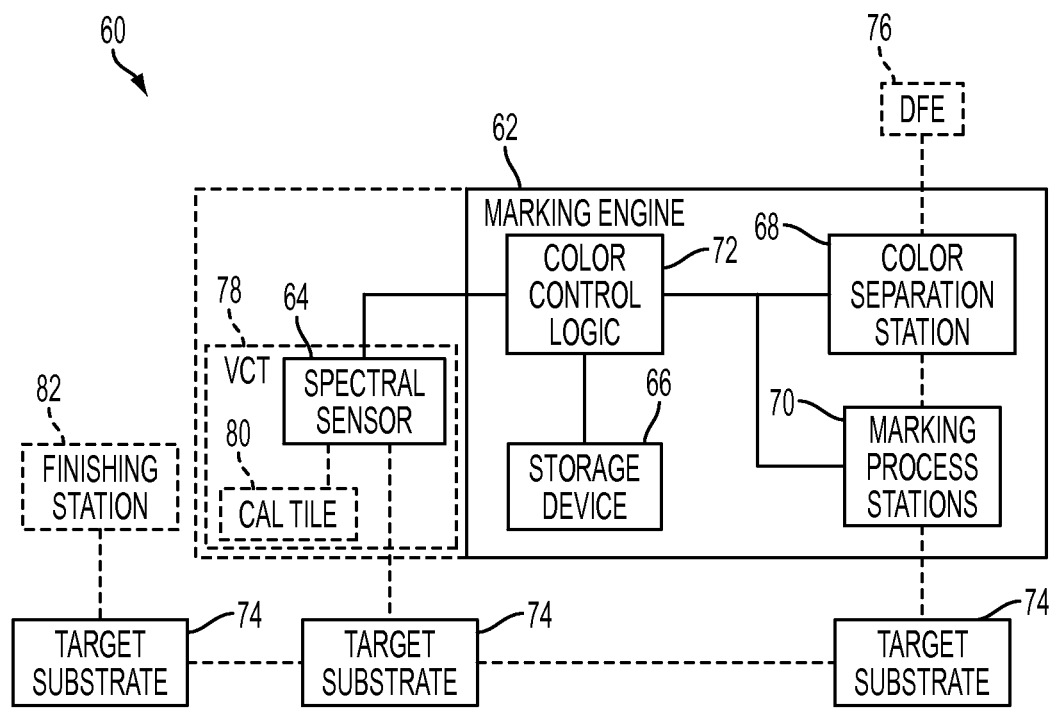
FIG. 3 is a block diagram of another exemplary embodiment of a multicolor marking platform.

With reference to FIG. 3, an exemplary embodiment of a multicolor marking platform 60 may include a marking engine 62 and a spectral sensor 64. The marking engine 62 may include a storage device 66, one or more non-black color separation stations 68, marking process stations 70, and a color control logic 72. The storage device 66 may store color standard data. The multicolor marking platform 60 may use the non-black color separation stations 68 and marking process stations 70 to selectively mark one or more color test pattern on a target substrate 74. Each color test pattern is related to a color represented in the color standard data. The color control logic 72 is in operative communication with the storage device 66 and provides color control applications to selectively control color characteristics of the marking engine 62 by controlling one or more station of the non-black color separation stations 68 and marking process stations 70.

The spectral sensor 64 is in operative communication with the marking engine 62 and may detect each color test pattern on the target substrate 74 and provide corresponding color measurement data to the color control logic 72 in relation to the selected color control application. The color control logic 72 may selectively control one or more station of the non-black color separation stations 68 and marking process stations 70 in response to the color measurement data and the corresponding color standard data in relation to the selected color control application.

In another embodiment, the multicolor marking platform 60 may also include a DFE 76 in operative communication with the marking engine 62 to selectively provide image data and control signals associated with a marking job to the marking engine 62 during normal operations. Notably, the DFE 76 does not control any of the color separation stations 68 or the marking process stations 70 in response to the color measurement data.

In still another embodiment, the marking engine 62 may include a xerographic marking engine (FIG. 2, 30). In the embodiment being described, each non-black color separation station 68 may include a charging station (FIG. 2, C2), an imaging and exposing station (FIG. 2, E2), and a developing station (FIG. 2, D2). The marking process stations 70 for the embodiment being described may include a transfer station (FIG. 2, 45) and a fusing station (FIG. 2, 48). The color control logic 72 may selectively control one or more station of the charging station, imaging and exposing station, developing station, transfer station, and fusing station associated with the xerographic marking engine in response to the color measurement data and the corresponding color standard data in relation to the selected color control application.

In yet another embodiment, the marking engine 62 may include a velocity change transport (VCT) station 78 on which the spectral sensor 64 may be. In the embodiment being described, the VCT station 78 may include a white calibration tile 80 disposed in relation to the spectral sensor 64 to permit self calibration of the spectral sensor 64. The sensor may break down measurement of the white color into individual measurements between 400-700 nm wavelengths and then compare those values to stored known "good" values.

In still yet another embodiment, the non-black color separation stations 68 may include a yellow color separation station (FIG. 2, 36), a magenta color separation station (FIG. 2, 38), and a cyan color separation station (FIG. 2, 40). In the embodiment being described, the color control logic 72 may selectively control one or more station of the cyan color separation station, magenta color separation station, yellow color separation station, and marking process stations in response to the color measurement data and the corresponding color standard data in relation to the selected color control application.

In various embodiments, the color standard data may include spectral standard data, L*a*b* standard data, XYZ standard data, CMY standard data, CMYK standard data, or RGB standard data in any suitable combination. Similarly, the color measurement data may include spectral measurement data, L*a*b* measurement data, XYZ measurement data, CMY measurement data, CMYK measurement data, or RGB measurement data in any suitable combination.

In one embodiment, the color control logic 72 may convert the color measurement data from a first color representation to a second color representation for which color standard data is provided. The first color representation may include spectral measurement data, L*a*b* measurement data, XYZ measurement data, CMY measurement data, CMYK measurement data, or RGB measurement data. The second color representation may include spectral measurement data, L*a*b* measurement data, XYZ measurement data, CMY measurement data, CMYK measurement data, or RGB measurement data. As conversion implies, the second color representation is different from the first color representation.

In another embodiment, the color control logic 72 may compare the color measurement data to corresponding color standard data for each color test pattern. Then, it may determine if the color measurement data is within a suitable tolerance of the corresponding color standard data. Next, it may implement an appropriate control action to correct for an out of tolerance condition by selectively adjusting one or more station of the non-black color separation stations 68 and marking process stations 70 if the color measurement data is not within the suitable tolerance. For the embodiment being described, the marking engine 62 may selectively mark color test patterns, such as color test pattern for which the color measurement data is not within the suitable tolerance, on another target substrate 74. The spectral sensor 64 and color control logic 72 may repeat the process of providing color control for color test patterns marked on another target substrate 74 until the color measurement data for each color test pattern on a last target substrate 74 is within the suitable tolerance.

In various embodiments, the color control applications may include a color calibration application, a color maintenance application, a TRC linearization application, a spot color measurement application, a spot color editing application, or a marking platform color profiling application in any suitable combination. The color control logic 72 may control one or more station of the marking engine 62 as described herein in real-time.

In one embodiment, the color measurement data may include a plurality of color metrics. In a further embodiment, the color measurement data may include spectral measurement data and the color metrics may include reflectance measurements at select wavelengths within a portion of the electromagnetic spectrum for light detectable by humans (e.g., 380 to 740 nanometers). In another further embodiment, the reflectance measurements may range from about 400 to about 700 nanometer wavelengths. Other ranges for the reflectance measurements are also possible. In yet another embodiment, the color metrics may include thirty-one (31) color metrics and the reflectance measurements may be spaced apart at about a ten (10) nanometer interval. Other intervals for the reflectance measurements are also possible. The range and interval for reflectance measurements can be altered to produce any suitable amount of color metrics for a desired range of colors.

In another embodiment, the spectral sensor 64 may include a spectrophotometer. The spectrophotometer may be disposed between the marking process stations 70 of the marking engine 62 and a finishing station 82 of the multicolor marking platform 60.

In various embodiments, the multicolor marking platform 60 may include at least one of an electrophotographic marking system, a xerographic marking system, an ink marking system, an inkjet marking system, a printing press, an offset printing press, a printer, a copier, and a multifunction device. The various components of the multicolor marking platform 60 disclosed herein may be implemented using hardware, software, or firmware in any suitable combination.

Figure 4:
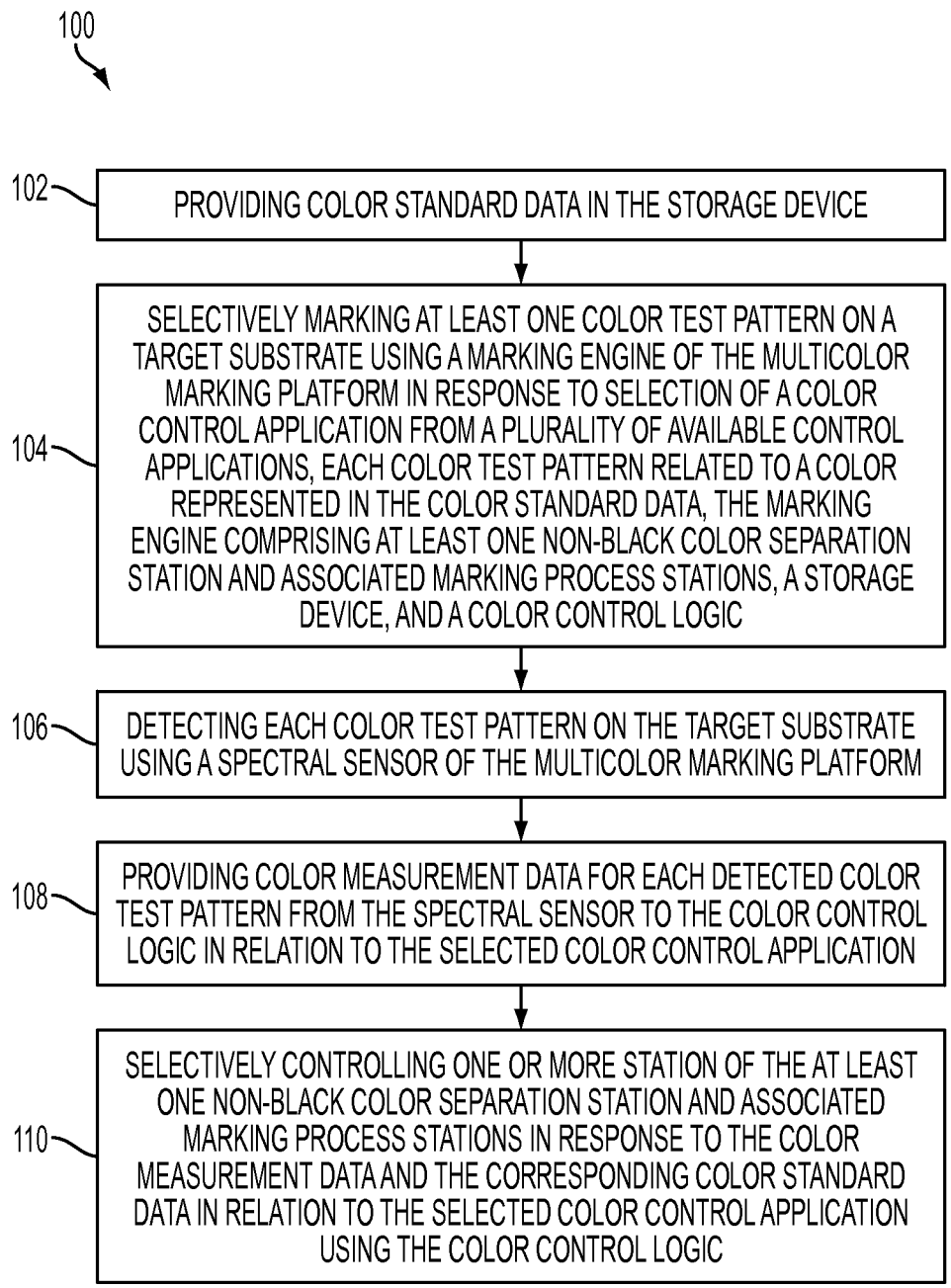
FIG. 4 is a flowchart of an exemplary embodiment of a process for controlling color in a multicolor marking platform.

With reference to FIG. 4, an exemplary embodiment of a process 100 for controlling color in a multicolor marking platform begins at 102 where color standard data may be provided in a storage device. At 104, at least one color test pattern may be selectively marked on a target substrate using a marking engine of the multicolor marking platform in response to selection of a color control application from a plurality of available control applications. Each color test pattern being related to a color represented in the color standard data. The marking engine may include one or more non-black color separation stations, marking process stations, a storage device, and a color control logic. Next, each color test pattern on the target substrate may be detected using a spectral sensor of the multicolor marking platform (106). At 108, color measurement data for each detected color test pattern may be provided from the spectral sensor to the color control logic in relation to the selected color control application. Next, one or more station of the non-black color separation stations and marking process stations may be selectively controlled in response to the color measurement data and the corresponding color standard data in relation to the selected color control application using the color control logic (110).

In still another embodiment, the marking engine may include a xerographic marking engine. In the embodiment being described, each non-black color separation station may include a charging station, an imaging and exposing station, and a developing station. The marking process stations for the embodiment being described may include a transfer station and a fusing station. In the embodiment being described, the process 100 may also include selectively controlling one or more station of the charging station, imaging and exposing station, developing station, transfer station, and fusing station associated with the xerographic marking engine in response to the color measurement data and the corresponding color standard data in relation to the selected color control application using the color control logic.

In still yet another embodiment, the non-black color separation stations may include a cyan color separation station, a magenta color separation station, and a yellow color separation station. In the embodiment being describe, the process 100 may also include selectively controlling one or more station of the cyan color separation station, magenta color separation station, yellow color separation station, and marking process stations in response to the color measurement data and the corresponding color standard data in relation to the selected color control application using the color control logic.

In one embodiment, the process may also include converting the color measurement data from a first color representation to a second color representation for which color standard data is provided using the color control logic. The first color representation may include spectral measurement data, L*a*b* measurement data, XYZ measurement data, CMY measurement data, CMYK measurement data, or RGB measurement data. The second color representation may include spectral measurement data, L*a*b* measurement data, XYZ measurement data, CMY measurement data, CMYK measurement data, or RGB measurement data. As conversion implies, the second color representation is different from the first color representation.

Figure 5:
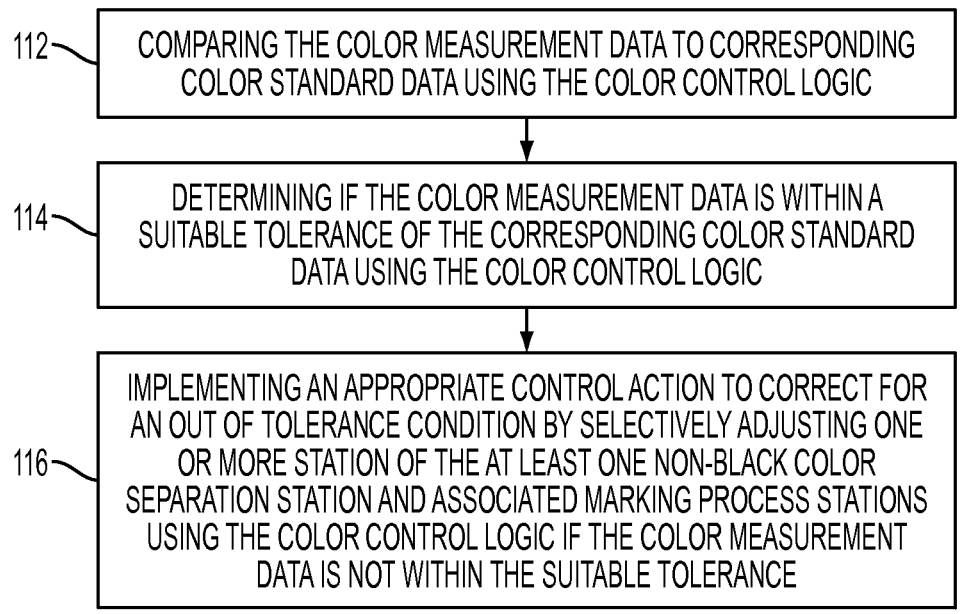
FIG. 5, in combination with FIG. 4, is a flowchart of another exemplary embodiment of a process for controlling color in a multicolor marking platform.

With reference to FIG. 5, in another embodiment, the process 100 of FIG. 4 may also include comparing the color measurement data to corresponding color standard data using the color control logic for each color test pattern (112). At 114, the color control logic may determine if the color measurement data is within a suitable tolerance of the corresponding color standard data. Next, an appropriate control action may be implemented by the color control logic to correct for an out of tolerance condition by selectively adjusting one or more station of the non-black color separation stations and marking process stations if the color measurement data is not within the suitable tolerance.

Figure 6:
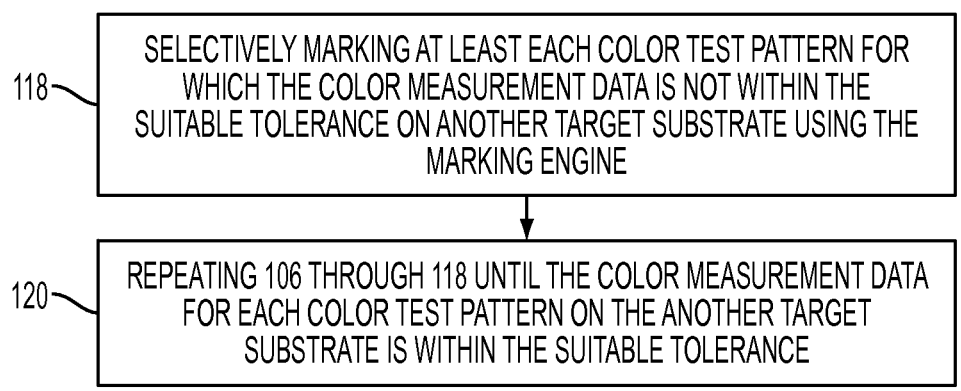
FIG. 6, in combination with FIGS. 4 and 5, is a flowchart of yet another exemplary embodiment of a process for controlling color in a multicolor marking platform.

With reference to FIG. 6, the process 100 of FIG. 4 may also include selectively marking color test patterns, such as color test patterns for which the color measurement data is not within the suitable tolerance, on another target substrate using the marking engine (118). At 120, repeating 106 through 118 until the color measurement data for each color test pattern on a last target substrate is within the suitable tolerance.

With continuing reference to FIG. 4, in various embodiments, the color control applications may include a color calibration application, a color maintenance application, a TRC linearization application, a spot color measurement application, a spot color editing application, or a marking platform color profiling application in any suitable combination. The color control logic may control one or more station of the marking engine as described herein in real-time. The various components of the process 100 for controlling color in a multicolor marking platform disclosed herein may be implemented using hardware, software, or firmware in any suitable combination.

Figure 7:
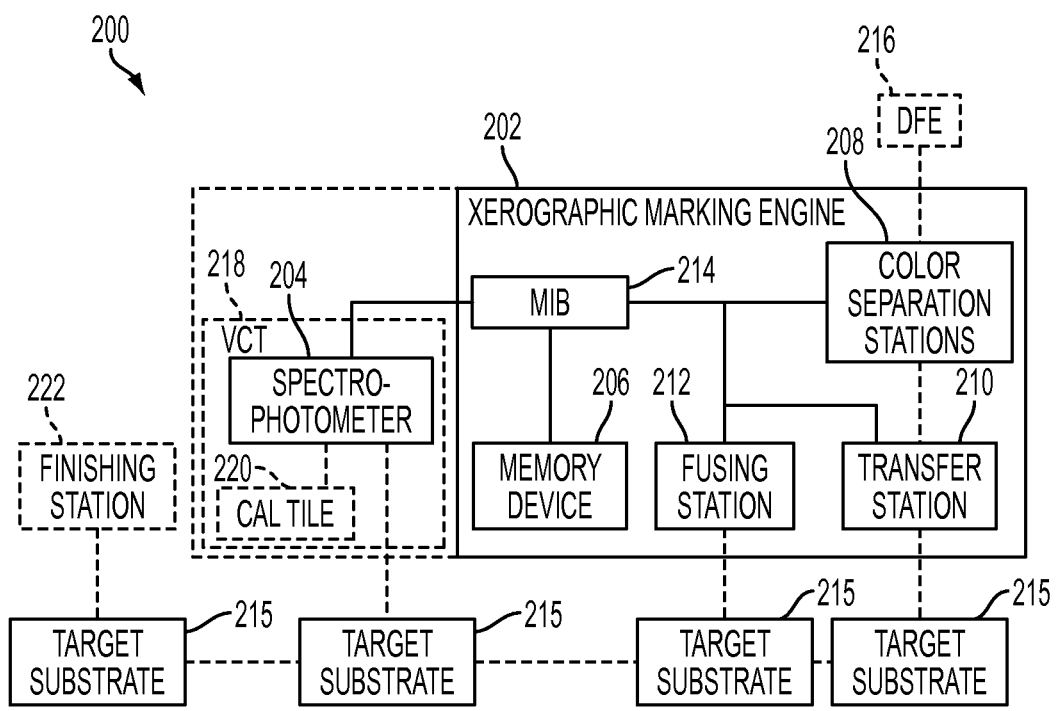
FIG. 7 is a block diagram of an exemplary embodiment of a multicolor xerographic marking platform.

With reference to FIG. 7, an exemplary embodiment of a multicolor xerographic marking platform 200 may include a xerographic marking engine 202 and a spectrophotometer 204. The xerographic marking engine 202 may include a memory device 206, a plurality of non-black color separation stations 208, a transfer station 210, a fusing station 212, and a MIB 214. Each non-black color separation station may include a charging station (FIG. 2, C2), an imaging and exposing station (FIG. 2, E2), and a developing station (FIG. 2, D2). The memory device 206 may store color standard data. The multicolor xerographic marking platform 200 may use the plurality of non-black color separation stations 208, transfer station 210, and fusing station 212 to selectively mark one or more color test pattern on a target substrate 215. Each color test pattern is related to a color represented in the color standard data. The MIB 214 is in operative communication with the memory device and provides color control applications to selectively control color characteristics of the xerographic marking engine 202 by controlling one or more station of the charging station, imaging and exposing station, developing station, transfer station 210, and fusing station 212 associated with the xerographic marking engine 202.

The spectrophotometer 204 in operative communication with the xerographic marking engine 202 and may detect each color test pattern on the target substrate 215 and provide corresponding color measurement data to the MIB 214 in relation to the selected color control application. The MIB 214 may selectively send information to a processor, such as an MIOP, that controls one or more station of the charging station (FIG. 2, C2), imaging and exposing station (FIG. 2, E2), developing station (FIG. 2, D2), transfer station 210, and fusing station 212 associated with the xerographic marking engine 202 in response to the color measurement data and the corresponding color standard data in relation to the selected color control application.

In another embodiment, the multicolor xerographic marking platform 200 may also include a DFE 216 in operative communication with the xerographic marking engine 202 to selectively provide image data and control signals associated with a xerographic marking job to the xerographic marking engine 202 during normal operations. Notably, the DFE 216 does not control any of the charging stations (FIG. 2, C2), imaging and exposing stations (FIG. 2, E2), developing stations (FIG. 2, D2), transfer station 210, or fusing station 212 associated with the xerographic marking engine 202 in response to the color measurement data.

In still another embodiment, the xerographic marking engine 202 may include a VCT station 218 on which the spectrophotometer 204 may be disposed. In the embodiment being described, the VCT station 218 may include a white calibration tile 220 disposed in relation to the spectrophotometer 204 to permit self calibration of the spectrophotometer 204. In an alternate embodiment, a calibration tile with a plurality of color test patterns representing various colors may be implemented.

In still yet another embodiment, the non-black color separation stations 208 may include a yellow color separation station (FIG. 2, 36), a magenta color separation station (FIG. 2, 38), and a cyan color separation station (FIG. 2, 40). In the embodiment being described, the MIB 214 may selectively control one or more station of the cyan color separation station, magenta color separation station, yellow color separation station, transfer station 210, and fusing station 212 associated with the xerographic marking engine in response to the color measurement data and the corresponding color standard data in relation to the selected color control application.

In one embodiment, the MIB 214 may convert the color measurement data from a first color representation to a second color representation for which color standard data is provided. The first color representation may include spectral measurement data, L*a*b* measurement data, XYZ measurement data, CMY measurement data, CMYK measurement data, or RGB measurement data. The second color representation may include spectral measurement data, L*a*b* measurement data, XYZ measurement data, CMY measurement data, CMYK measurement data, or RGB measurement data. As conversion implies, the second color representation is different from the first color representation.

In another embodiment, the MIB 214 may compare the color measurement data to corresponding color standard data for each color test pattern. Then, it may determine if the color measurement data is within a suitable tolerance of the corresponding color standard data. Next, it may send data to a processor, such as an MIOP, to implement an appropriate control action to correct for an out of tolerance condition by selectively adjusting one or more station of the charging station (FIG. 2, C2), imaging and exposing station (FIG. 2, E2), developing station (FIG. 2, D2), transfer station 210, and fusing station 212 associated with the xerographic marking engine 202 if the color measurement data is not within the suitable tolerance. For the embodiment being described, the xerographic marking engine 202 may selectively mark color test patterns, such as color test patterns for which the color measurement data is not within the suitable tolerance, on another target substrate 215. The spectrophotometer 204 and MIB 214 may repeat the process of providing color control for color test patterns marked on another target substrate 215 until the color measurement data for each color test pattern on a last target substrate 215 is within the suitable tolerance. This reflects an iterative process whereby color test patterns may be progressively reduced as out of tolerance conditions are corrected.

In various embodiments, the color control applications may include a color calibration application, a color maintenance application, a TRC linearization application, a spot color measurement application, a spot color editing application, or a marking platform color profiling application in any suitable combination. The MIB 214 may send data to a processor, such as the MIOP, to control one or more station of the xerographic marking engine 202 as described herein in real-time.

In another embodiment, the spectrophotometer 204 may be disposed between the fusing station 212 of the xerographic marking engine 202 and a finishing station 222 of the multicolor xerographic marking platform 200. The various components of the multicolor xerographic marking platform 200 disclosed herein may be implemented using hardware, software, or firmware in any suitable combination.

Figure 8A:
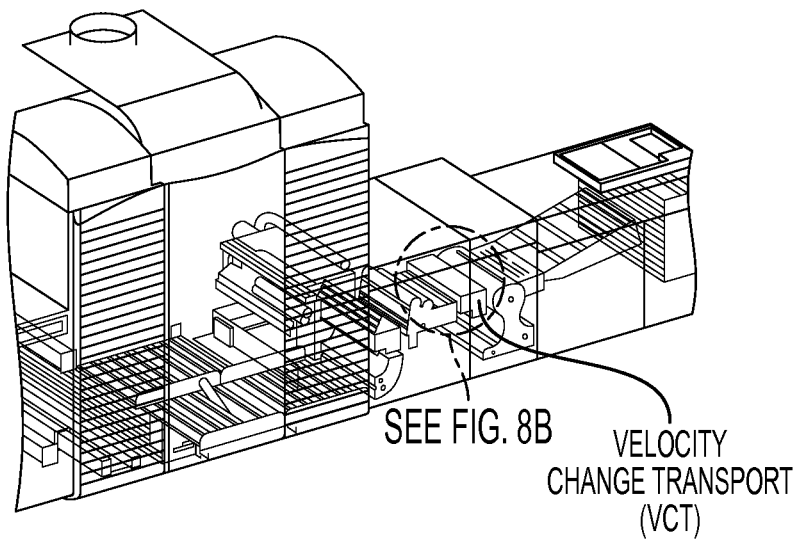
FIG. 8A is a perspective drawing of an exemplary embodiment of a multicolor xerographic marking platform.
Figure 8B:
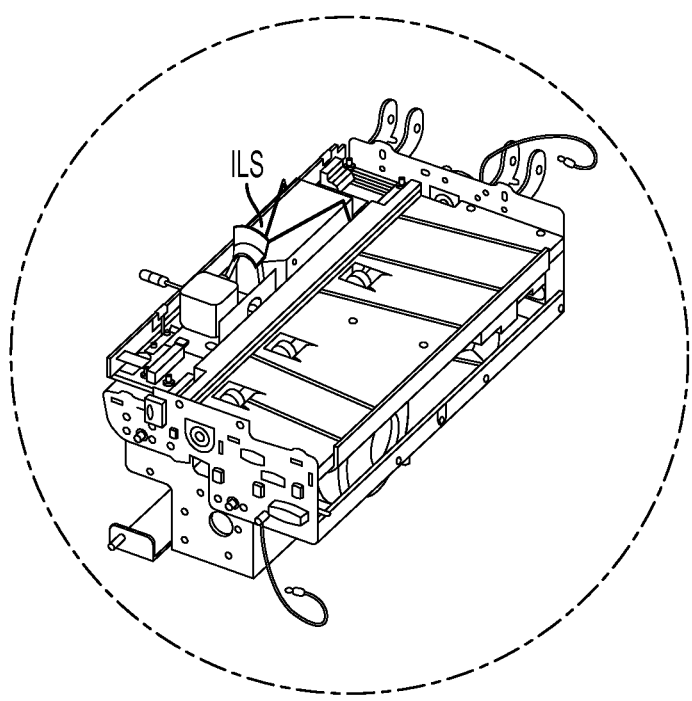
FIG. 8B is a perspective drawing of an exemplary embodiment of a velocity change transport (VCT) from the multicolor xerographic marking platform of FIG. 8A.

With reference to FIG. 8A, an exemplary embodiment of a multicolor xerographic marking platform includes a PE in which the location of the inline spectrophotometer (ILS) is in a VCT. FIG. 8B shows a closer view of the VCT and the location of the ILS. As shown, the location of the ILS may be along the PE paper path after the fuser sub-system.

Figure 9:
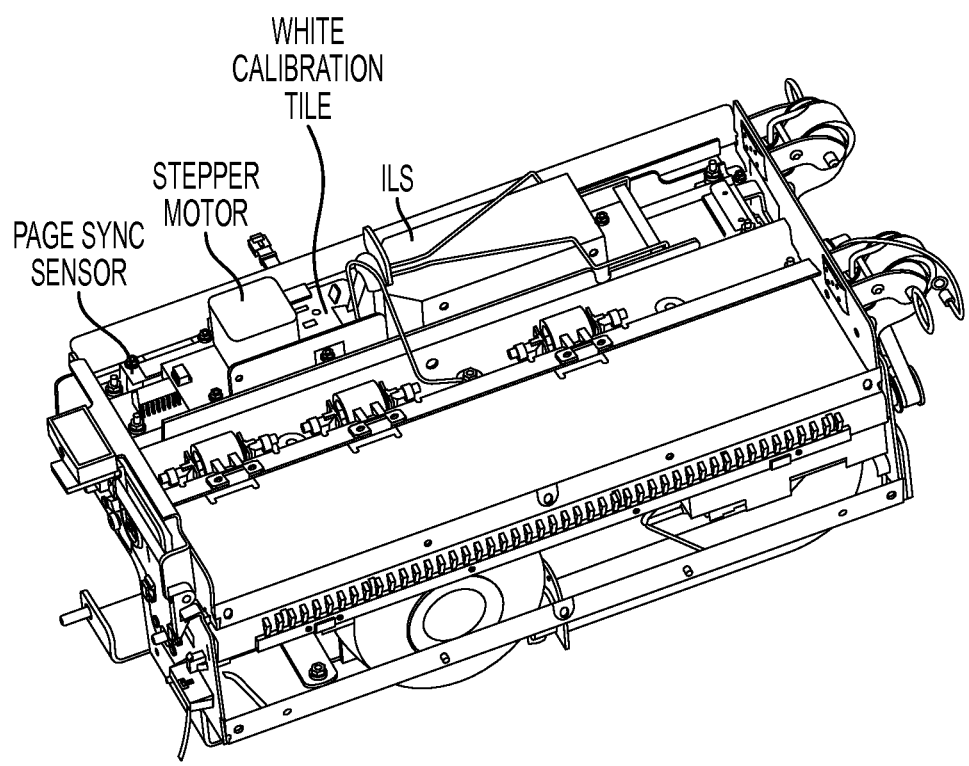
FIG. 9 is another perspective drawing of an exemplary embodiment of a VCT from the multicolor xerographic marking platform of FIG. 8A.

With reference to FIG. 9, an exemplary embodiment of the VCT shows where the ILS may be located, as well as the mounting of a white calibration tile inside a wedge to allow the ILS to self calibrate. This architecture allows the ILS to maintain its factory calibration as well as providing a protective boundary to both the ILS lens and the white calibration tile.

Figure 10:
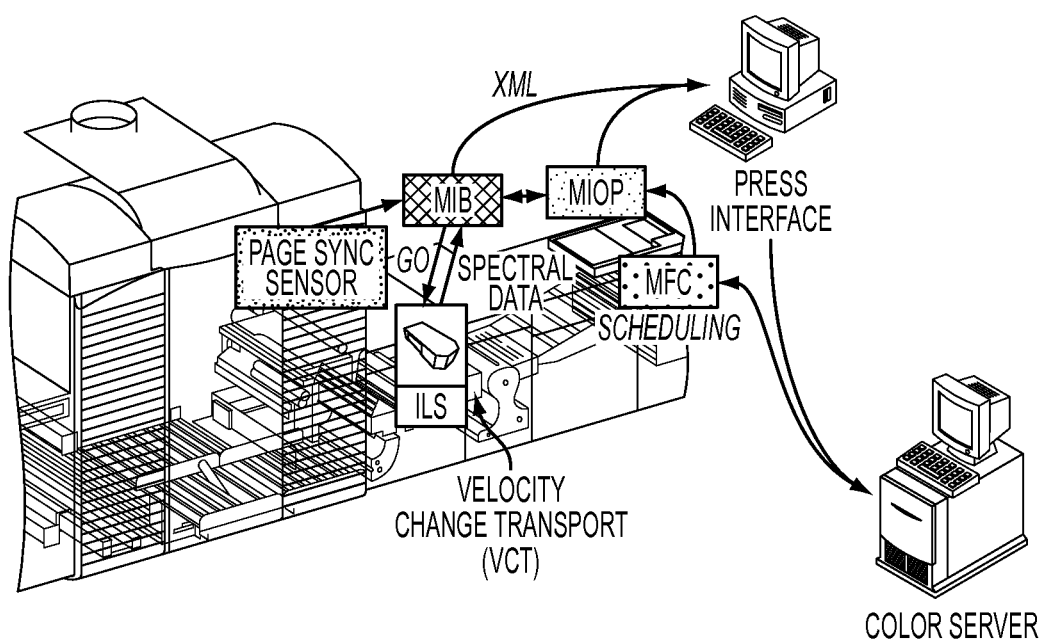
FIG. 10 is a functional diagram showing an exemplary arrangement of components for controlling color in an exemplary embodiment of a multicolor xerographic marking platform in relation to the perspective drawing of FIG. 8A.

With reference to FIG. 10, an exemplary embodiment of a multicolor xerographic marking platform shows that the ILS may allow the PE to see the spectral data in real-time. A page sync sensor may permit the MIB to detect the lead edge (LE) of the paper. After LE detection, the MIB may send a "GO" signal to the ILS to start reading the impending color patches on the paper. The ILS may read the color patches (i.e., color test patterns) as shown in the sample test document of FIG. 15. The spectral values from spot reads of the color patches may be sent from the ILS to the MIB. The data in the MIB may be processed and sent to the MIOP board or directly to the program and system information protocol (PSIP) module. The processing on the MIB of the spectral data may use a correction matrix to convert the raw data. This may adjust for both thermal color shifts from the fuser as well as matching a market standard measurement device, such as the DTP70 or i1 iSis automated spectrophotometers from X-Rite of Grand Rapids, Mich. The spectral data may be stored in an XML formatted file for either the PSIP or DFE applications. The PSIP may also do the calculation to send either spectral or L*a*b* data depending on the request. This enables level 3 XC (Xerographic Controls) in the PE. Level 3 XC maintains each primary color separation based on fused images on target stock. This may also enable level 4 and 5 XC controls. Level 4 XC maintains overlaid colors based on fused images on target stock. Level 5 XC maintains colors across machines based on fused images on target stock. This was not possible in previous architectures that sent spectral data to the DFE. The PSIP can send the data to the DFE to enable other color management functions, such as profiling.

Figure 11:
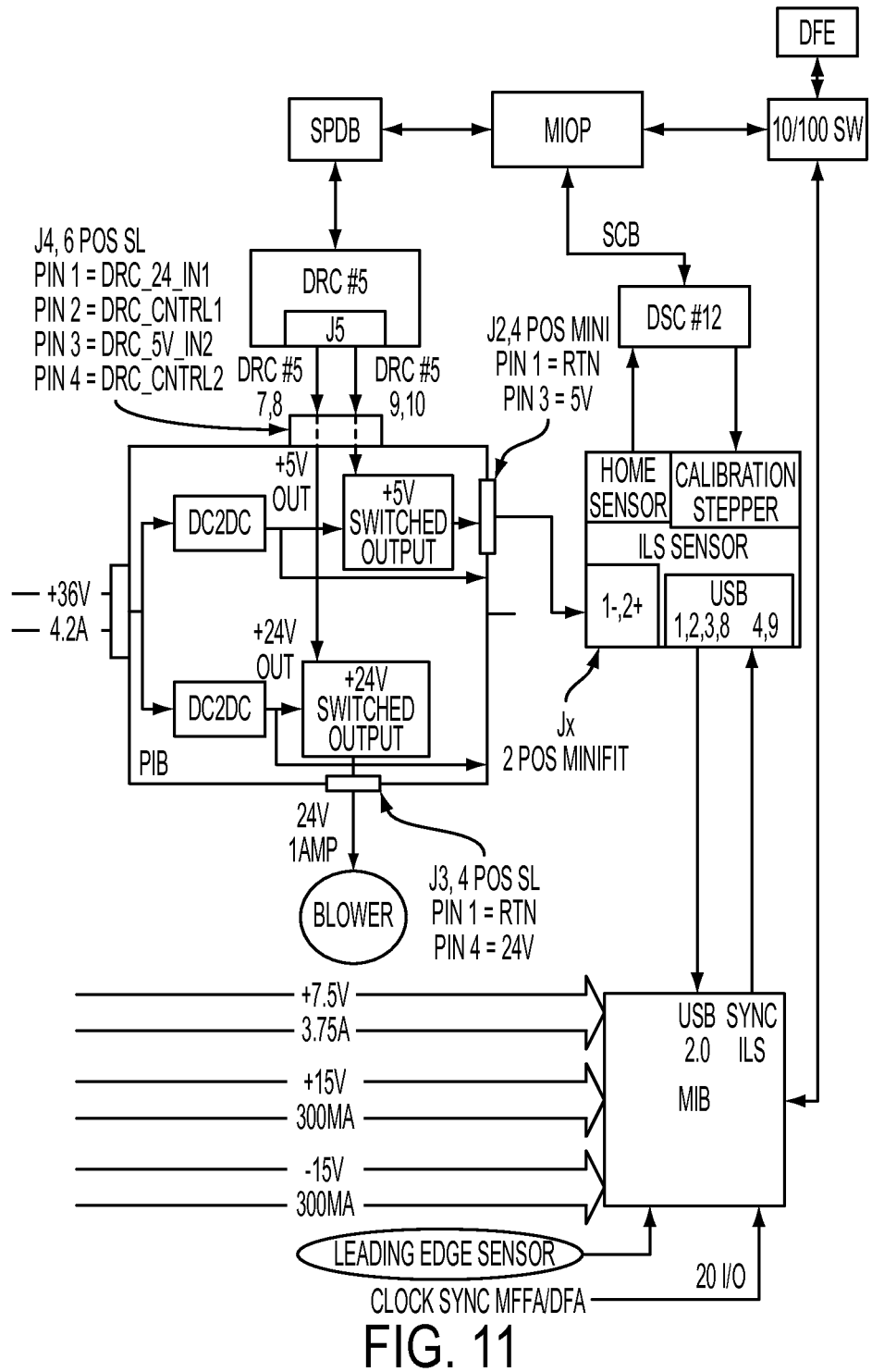
FIG. 11 is a block diagram showing an exemplary arrangement of components for controlling color in another exemplary embodiment of a multicolor xerographic marking platform.

With reference to FIG. 11, an exemplary electrical architecture for controlling color in an exemplary embodiment of a multicolor xerographic marking platform provides closed loop PE control. This architecture provides a USB interface to a controlled component (e.g., the ILS). The MIB may be located on the outboard of the 'Output Module Panel'. This may provide the interface between an ILS sensor and the PE. Communication may utilize, for example, USB 2.0 protocol. The ILS sensor, for example, may include a spectrophotometer from X-Rite of Grand Rapids, Mich., such as the ILS 15. The USB interface may also carry signals to sync the ILS sensor with the LE sensor (i.e., page sync sensor). The power interface board (PIB) may be located on the inboard side of the 'Output Module Panel'. This may provide power to the ILS sensor and the blower. The dual stepper controller (DSC) may provide power and controls to the stepper motor and the home sensor. The digital remote controller (DRC) may provide a switched output to the PIB board.

Figure 12:
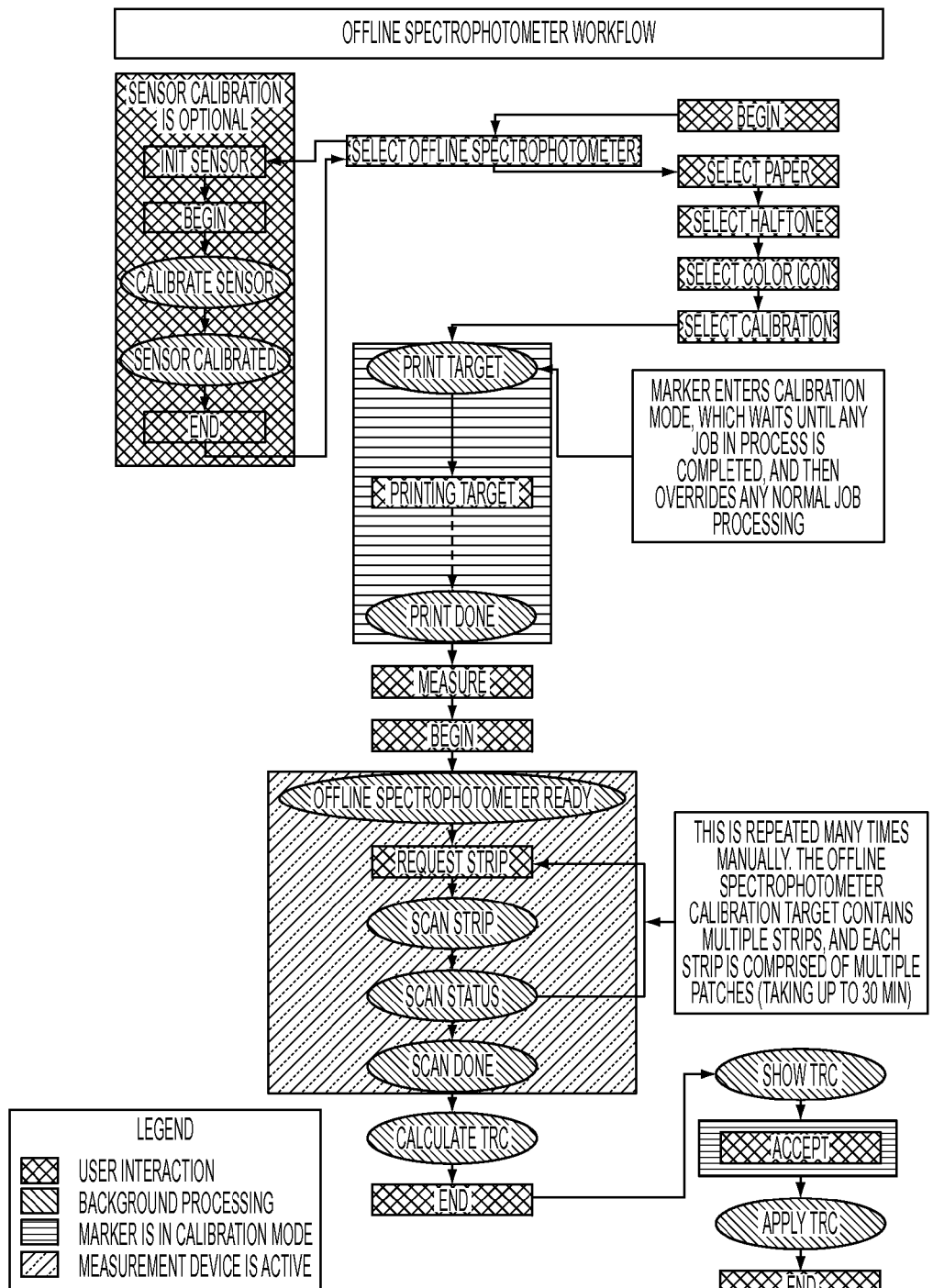
FIG. 12 is a flowchart showing an exemplary embodiment of a process for controlling color in a multicolor xerographic marking platform using an offline spectrophotometer.
Figure 13:
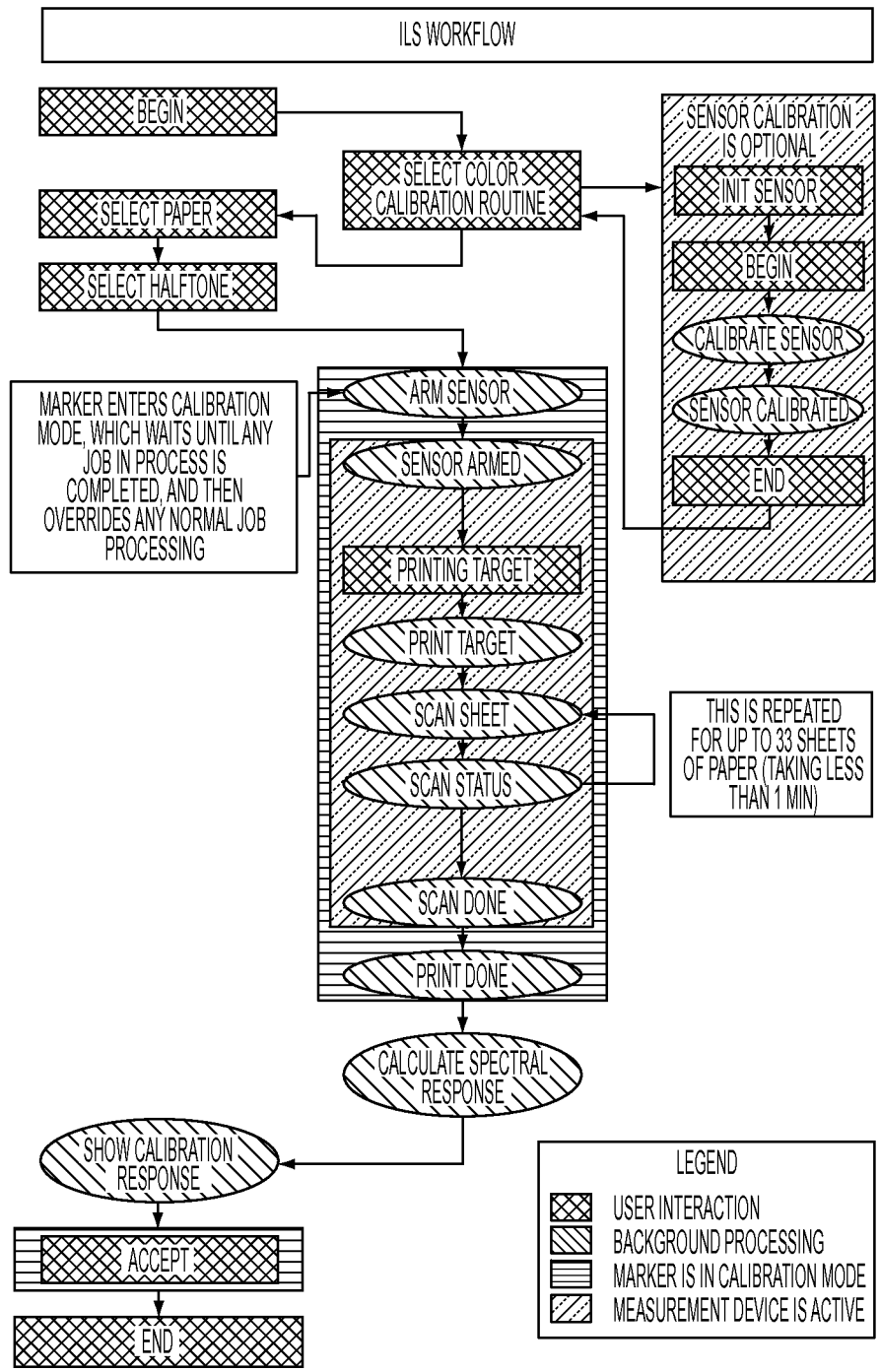
FIG. 13 is a flowchart showing an exemplary embodiment of a process for controlling color in a multicolor xerographic marking platform using an inline spectrophotometer (ILS)
Figure 14:
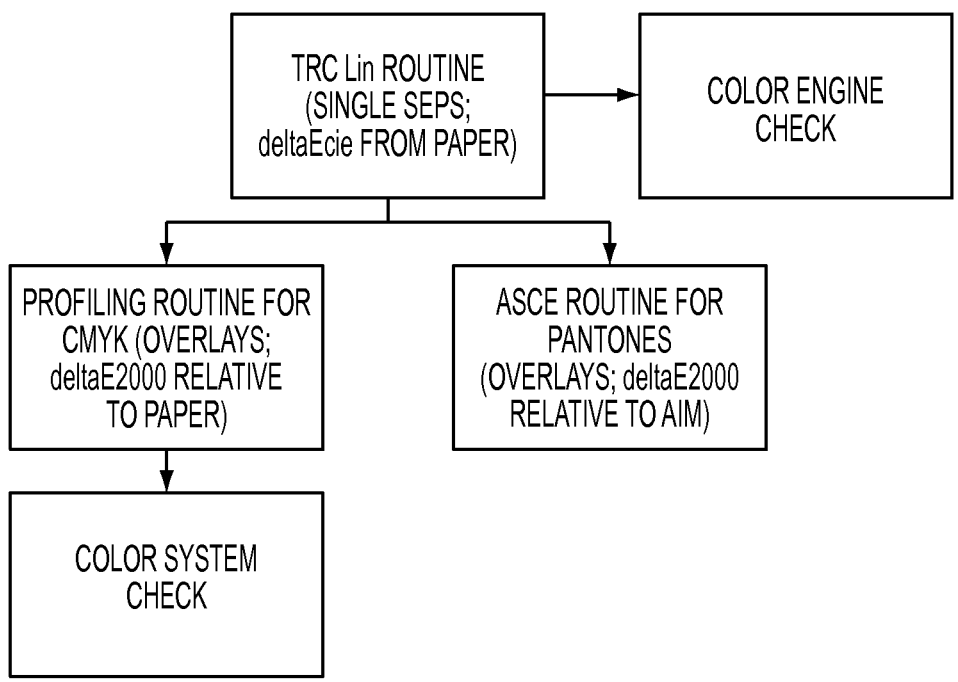
FIG. 14 is a flowchart showing an exemplary embodiment of a process for controlling color in a multicolor xerographic marking platform using various color control applications.

With reference to FIGS. 12 and 13, an example of an existing work flow using an offline spectrophotometer (e.g., X-rite's DTP-41) and an exemplary embodiment of an ILS work flow are provided for comparison. For example, the ILS work flow may result in about a 20-30 minute reduction in calibration time for the customer. As shown in FIG. 14, the ILS work flow may also enable new color management tools to be implemented, such as a PE color system maintenance tool, TRC linearization, spot color measurements, auto spot color editing, profiling, etc.

Figure 15:
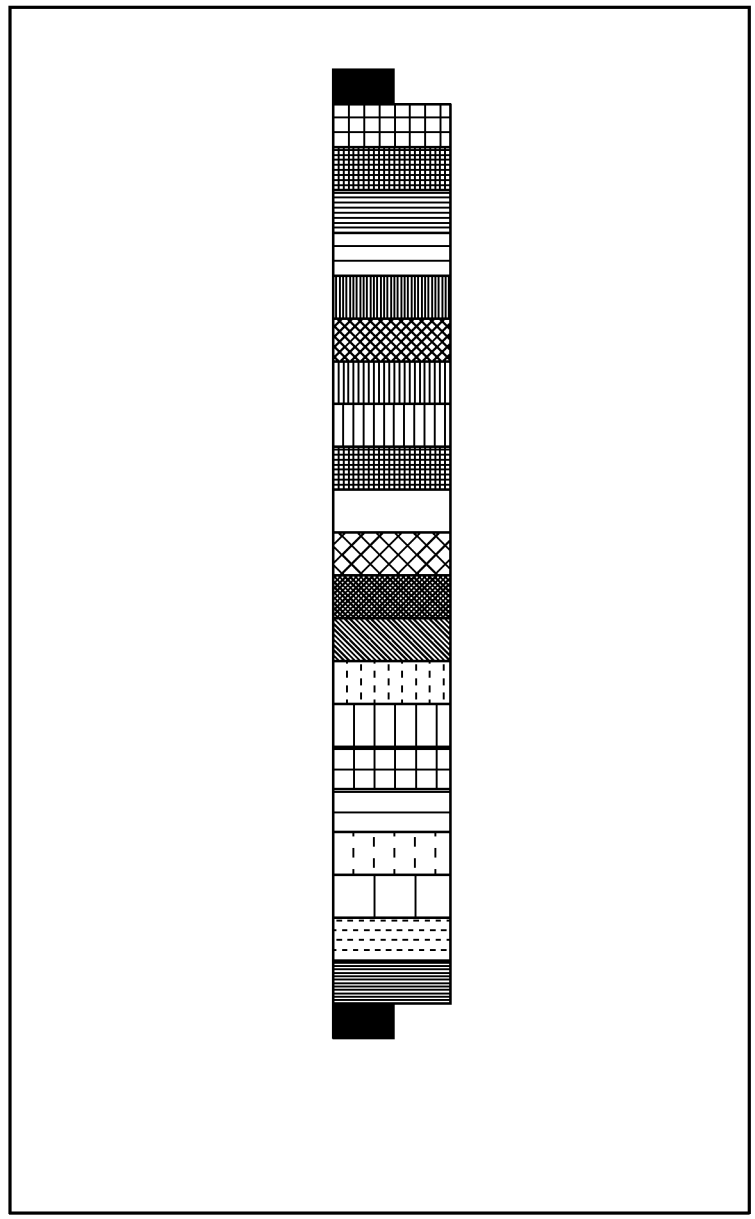
FIG. 15 is an exemplary embodiment of set of color test patterns marked on a target substrate.

With reference to FIG. 15, an exemplary embodiment of a set of color test patterns marked on a target substrate are shown. The black blocks at the top and bottom of the substrate may be used to detect the start and end of the test patterns. Each block between the black blocks is a color test pattern. For example, color test patterns may represent each non-black color separation station of the marking engine at various densities and a variety of overlay combinations of two or more non-black color separation stations.

In summary, an exemplary closed loop PE color calibration routine may utilize a spectrophotometer within the PE. This may allow the PE to dynamically read the spectral or L*a*b* data and correct that data using a correction algorithm for xerographic and market standards. Thus, real time color stability control may be provided through the PE MIOP board.

The spectral data from the ILS may be automatically shifted to compensate for the thermochromaticity change exiting the fuser. The spectral data may also be shifted to compensate for instrument-to-instrument variation offset from the color standard, as set by the graphics art Industry.

The various embodiments of a method and apparatus for dynamic color control disclosed herein support a number of different calibration routines that may increase overall customer productivity and provide tighter control on color stability. As disclosed herein, dynamic color control may eliminate the lengthy set of patches needed to run in order to manually calibrate the DFE.

Additionally, the various embodiments of a method and apparatus for dynamic color control disclosed herein may enable a control loop to the PE instead of the DFE, may enable level 3-5 XC, may allow TIPP and other PE's to be calibrated to each other, and may permit new color test patterns to be developed relatively quickly, processed by the PE relatively immediately, and maintained in the PSIP (instead of the DFE).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus for controlling color in a multicolor marking platform, comprising:
   a marking engine, comprising:
      a storage device storing color standard data;
      at least one non-black color separation station and associated marking process stations to selectively mark at least one color test pattern on a target substrate, each color test pattern related to a color represented in the color standard data; and
      a color control logic in operative communication with the storage device and configured to dynamically control color characteristics of the marking engine by controlling one or more station of the at least one non-black color separation station and associated marking process stations in response to selection of a color control application from a plurality of color control applications; and
   a spectral sensor in operative communication with the marking engine to detect each color test pattern on the target substrate and provide corresponding color measurement data to the color control logic in conjunction with operation of the selected color control application;
   wherein the color control logic is configured to dynamically control one or more station of the at least one non-black color separation station and associated marking process stations in response to the color measurement data and the corresponding color standard data in conjunction with operation of the selected color control application.

2. The apparatus set forth in claim 1, further comprising:
   a digital front end in operative communication with the marking engine to selectively provide image data and control signals associated with a marking job to the marking engine during normal operations;
   wherein the digital front end does not control any of the at least one non-black color separation station or the associated marking process stations in response to the color measurement data.

3. The apparatus set forth in claim 1, the marking engine comprising:
- a xerographic marking engine;
- each non-black color separation station comprising:
  - a charging station;
  - an imaging and exposing station; and
  - a developing station;
- the associated marking process stations comprising:
  - a transfer station; and
  - a fusing station;
- wherein the color control logic selectively controls one or more station of the charging station, imaging and exposing station, developing station, transfer station, and fusing station associated with the xerographic marking engine in response to the color measurement data and the corresponding color standard data in relation to the selected color control application.

4. The apparatus set forth in claim 1, the marking engine comprising:
- a velocity change transport station on which the spectral sensor is disposed.

5. The apparatus set forth in claim 4, the velocity change transport station including a calibration tile disposed in relation to the spectral sensor to permit self calibration of the spectral sensor.

6. The apparatus set forth in claim 1, the at least one non-black color separation station comprising:
- a cyan color separation station;
- a magenta color separation station; and
- a yellow color separation station;
- wherein the color control logic selectively controls one or more station of the cyan color separation station, magenta color separation station, yellow color separation station, and associated marking process stations in response to the color measurement data and the corresponding color standard data in relation to the selected color control application.

7. The apparatus set forth in claim 1, the color standard data including at least one of spectral standard data, L*a*b* standard data, XYZ standard data, CMY standard data, CMYK standard data, and RGB standard data.

8. The apparatus set forth in claim 1, the color measurement data including at least one of spectral measurement data, L*a*b* measurement data, XYZ measurement data, CMY measurement data, CMYK measurement data, and RGB measurement data.

9. The apparatus set forth in claim 1, the plurality of color control applications including at least one of a color calibration application, a color maintenance application, a tone reproduction curve linearization application, a spot color measurement application, a spot color editing application, and a marking platform color profiling application.

10. The apparatus set forth in claim 1 wherein the color control logic controls the one or more station of the marking engine in real-time.

11. The apparatus set forth in claim 1, the spectral sensor comprising:
- a spectrophotometer.

12. The apparatus set forth in claim 11 wherein the spectrophotometer is disposed between the marking process stations of the marking engine and a finishing station of the multicolor marking platform.

13. The apparatus set forth in claim 1 wherein the multicolor marking platform is at least one of an electrophotographic marking system, a xerographic marking system, an ink marking system, an inkjet marking system, a printing press, an offset printing press, a printer, a copier, and a multifunction device.

14. A method of controlling color in a multicolor marking platform, comprising:
- a) providing color standard data in a storage device;
- b) selectively marking at least one color test pattern on a target substrate using a marking engine of the multicolor marking platform in response to selection of a color control application from a plurality of color control applications in conjunction with operation of the multicolor marking platform, each color test pattern related to a color represented in the color standard data, the marking engine comprising at least one non-black color separation station, associated marking process stations, the storage device, and a color control logic;
- c) detecting each color test pattern on the target substrate using a spectral sensor of the multicolor marking platform;
- d) providing color measurement data for each detected color test pattern from the spectral sensor to the color control logic in conjunction with operation of the selected color control application; and
- e) dynamically controlling one or more station of the at least one non-black color separation station and associated marking process stations using the color control logic in response to the color measurement data and the corresponding color standard data in conjunction with operation of the selected color control application.

15. The method set forth in claim 14, further comprising:
- f) selectively providing image data and control signals associated with a marking job from a digital front end associated with the multicolor marking platform to the marking engine during normal operations, wherein the digital front end does not control any of the at least one non-black color separation station or the associated marking process stations in response to the color measurement data.

16. The method set forth in claim 14 wherein the marking engine includes a xerographic marking engine, each non-black color separation station includes a charging station, an imaging and exposing station, and a developing station, and the associated marking process stations include a transfer station and a fusing station, the method further comprising:
- f) selectively controlling one or more station of the charging station, imaging and exposing station, developing station, transfer station, and fusing station associated with the xerographic marking engine in response to the color measurement data and the corresponding color standard data in relation to the selected color control application using the color control logic.

17. The method set forth in claim 14 wherein the at least one non-black color separation station includes a cyan color separation station, a magenta color separation station, and a yellow color separation station, the method further comprising:
- f) selectively controlling one or more station of the cyan color separation station, magenta color separation station, yellow color separation station, and associated marking process stations in response to the color measurement data and the corresponding color standard data in relation to the selected color control application using the color control logic.

18. The method set forth in claim 14, further comprising:
- f) converting the color measurement data from a first color representation to a second color representation for which color standard data is provided using the color control logic, the first color representation including at least one of spectral measurement data, L*a*b* measurement data, XYZ measurement data, CMY measurement data, CMYK measurement data, and RGB measurement data, the second color representation including at least one of spectral measurement data, L*a*b* measurement data, XYZ measurement data, CMY measurement data, CMYK measurement data, and RGB measurement data, wherein the second color representation is different from the first color representation.

19. The method set forth in claim 14, for each color test pattern, the method further comprising:
f) comparing the color measurement data to corresponding color standard data using the color control logic;
g) determining if the color measurement data is within a suitable tolerance of the corresponding color standard data using the color control logic; and
h) implementing an appropriate control action to correct for an out of tolerance condition by selectively adjusting one or more station of the at least one non-black color separation station and associated marking process stations using the color control logic if the color measurement data is not within the suitable tolerance.

20. The method set forth in claim 19, further comprising:
i) selectively marking at least each color test pattern for which the color measurement data is not within the suitable tolerance on another target substrate using the marking engine; and
j) repeating c) through i) until the color measurement data for each color test pattern on a last target substrate is within the suitable tolerance.

21. The method set forth in claim 14 wherein the plurality of color control applications include at least one of a color calibration application, a color maintenance application, a tone reproduction curve linearization application, a spot color measurement application, a spot color editing application, and a marking platform color profiling application.

22. The method set forth in claim 14 wherein the color control logic controls the one or more station of the marking engine in real-time.

23. The method set forth in claim 14 wherein the color measurement data includes a plurality of color metrics.

24. The method set forth in claim 23 wherein the color measurement data includes spectral measurement data and the plurality of color metrics includes reflectance measurements at select wavelengths within the portion of the electromagnetic spectrum for light detectable by humans;
wherein the reflectance measurements range from about 400 to about 700 nanometer wavelengths; and
wherein the plurality of color metrics include 31 color metrics and the reflectance measurements are spaced apart at about a 10 nanometer interval.

25. An apparatus for controlling color in a multicolor xerographic marking platform, comprising:
a xerographic marking engine, comprising:
a memory device storing color standard data;
a plurality of non-black color separation stations, a transfer station, and a fusing station to selectively mark at least one color test pattern on a target substrate, each non-black color separation station including a charging station, an imaging and exposing station, and a developing station, each color test pattern related to a color represented in the color standard data; and
a multi-purpose interface board in operative communication with the memory device and providing color control applications that send data to a processor to selectively control color characteristics of the xerographic marking engine by controlling one or more station of the charging station, imaging and exposing station, developing station, transfer station, and fusing station associated with the xerographic marking engine, wherein the color control applications include at least one of a color calibration application, a color maintenance application, a tone reproduction curve linearization application, a spot color measurement application, a spot color editing application, and a marking platform color profiling application; and
a spectrophotometer in operative communication with the xerographic marking engine and disposed between the fusing station of the xerographic marking engine and a finishing station of the multicolor xerographic marking platform to detect each color test pattern on the target substrate and provide corresponding color measurement data to the multi-purpose interface board in relation to the selected color control application;
wherein the multi-purpose interface board selectively controls one or more station of the charging station, imaging and exposing station, developing station, transfer station, and fusing station associated with the xerographic marking engine in response to the color measurement data and the corresponding color standard data in real-time in relation to the selected color control application.

* * * * *